United States Patent
Beimler et al.

(10) Patent No.: US 8,011,828 B2
(45) Date of Patent: *Sep. 6, 2011

(54) SHOULDER JOINT

(75) Inventors: Franz Beimler, Weiden (DE); Michael Kleber, Eslarn (DE); Marianne Köferl, Fichtelberg (DE); Joachim Trummer, Vilseck (DE); Dieter Wöhrl, Kemnath (DE)

(73) Assignee: Siemens Aktiengesellschaft, Munich (DE)

( * ) Notice: Subject to any disclaimer, the term of this patent is extended or adjusted under 35 U.S.C. 154(b) by 228 days.

This patent is subject to a terminal disclaimer.

(21) Appl. No.: 12/122,082

(22) Filed: May 16, 2008

(65) Prior Publication Data

US 2008/0292061 A1 Nov. 27, 2008

(30) Foreign Application Priority Data

May 23, 2007 (DE) .......................... 10 2007 023 847

(51) Int. Cl.
*B25J 18/04* (2006.01)
(52) U.S. Cl. ................... 378/189; 378/190; 901/15
(58) Field of Classification Search .................. 378/204, 378/210, 189, 190, 196, 197, 198; 901/15, 901/28, 48
See application file for complete search history.

(56) References Cited

U.S. PATENT DOCUMENTS

| | | | | |
|---|---|---|---|---|
| 4,024,403 A | * | 5/1977 | Bernstein et al. | 378/177 |
| 4,065,001 A | * | 12/1977 | Ohnaka | 414/733 |
| 4,431,366 A | * | 2/1984 | Inaba et al. | 414/735 |
| 4,894,855 A | * | 1/1990 | Kresse | 378/196 |
| 4,929,147 A | | 5/1990 | Jenkner | |
| 2003/0192758 A1 | * | 10/2003 | Murata | 188/382 |
| 2005/0115352 A1 | | 6/2005 | Tanaka | |
| 2006/0145495 A1 | * | 7/2006 | Fang et al. | 294/106 |
| 2008/0294264 A1 | * | 11/2008 | Beimler et al. | 378/208 |

FOREIGN PATENT DOCUMENTS

| | | |
|---|---|---|
| CN | 2258032 Y | 7/1997 |
| CN | 2591638 Y | 12/2003 |
| DE | 26 28 734 A1 | 12/1977 |
| DE | 103 19 933 A1 | 12/2004 |
| DE | 10 2004 004 238 A1 | 1/2007 |
| FR | 2 809 048 A1 | 11/2001 |
| WO | WO 89/11435 A1 | 11/1989 |

OTHER PUBLICATIONS

German Office Action dated Jun. 29, 2010 for DE 10 2007 023 847.0-15.
Chinese Office Action dated Nov. 12, 2010 for Chinese Patent Application No. 200810191174.5 with English translation.

* cited by examiner

*Primary Examiner* — Chih-Cheng G Kao
(74) *Attorney, Agent, or Firm* — Lempia Summerfield Katz LLC

(57) ABSTRACT

A shoulder joint is provided. The shoulder joint includes a main support; a fold-out arm including an upper arm and a lower arm, the upper arm operable to pivot about a pin and the lower arm operable to pivot on a spindle on one end of the upper arm; and a first wheel attached to the pin, and a second wheel attached to the spindle. The upper arm and the lower arm are mechanically linked via the two wheels in such a way that rotation of the upper arm about the pin cause rotation of the second wheel and the lower arm relative to the upper arm, resulting in a bending or straightening of the arm.

21 Claims, 15 Drawing Sheets

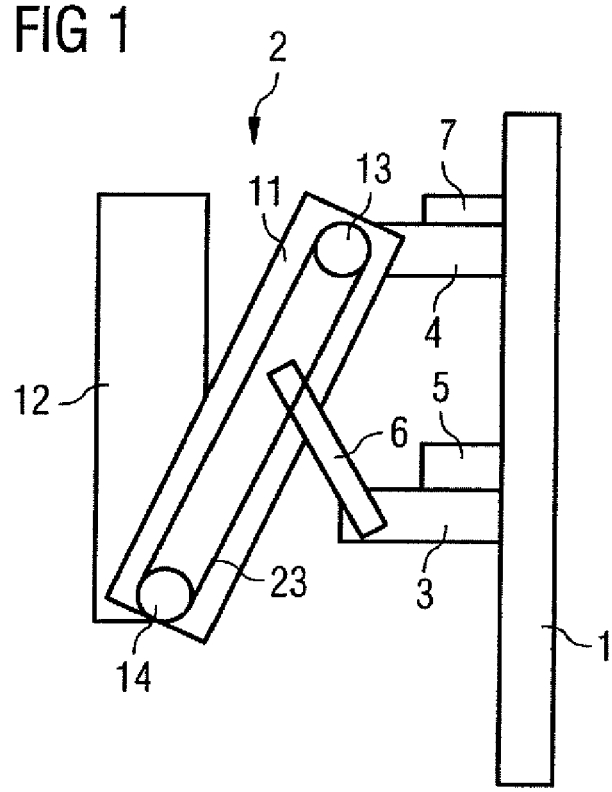
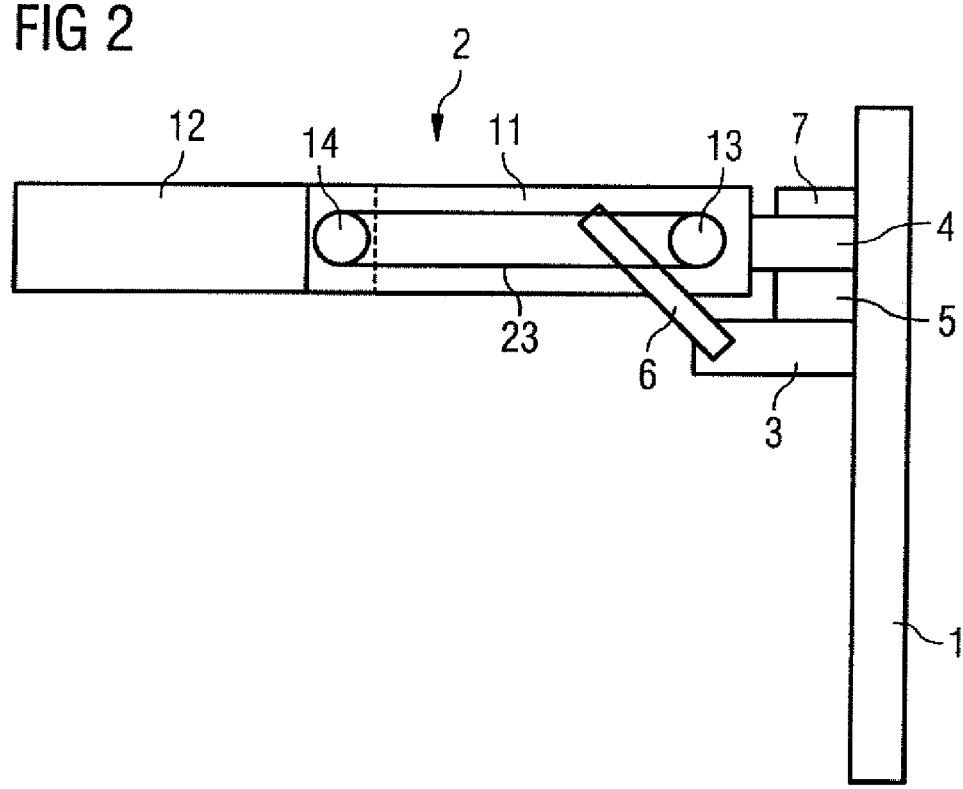

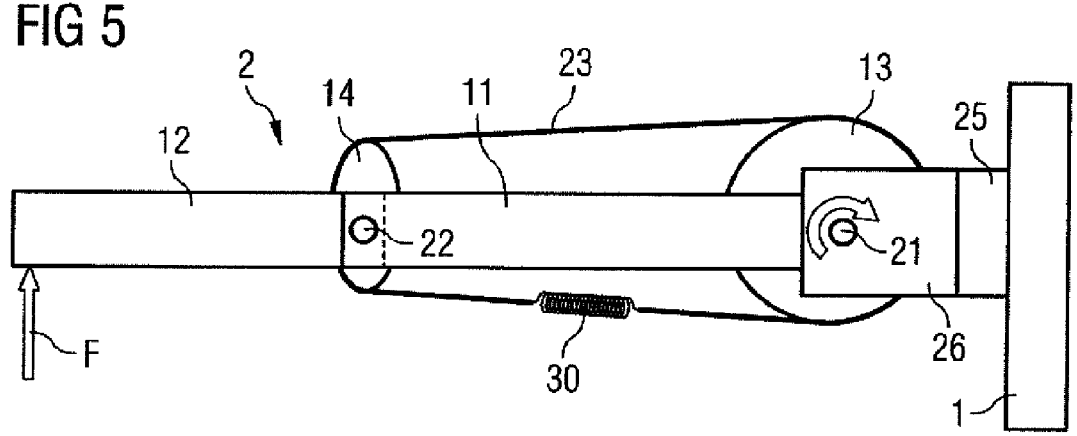
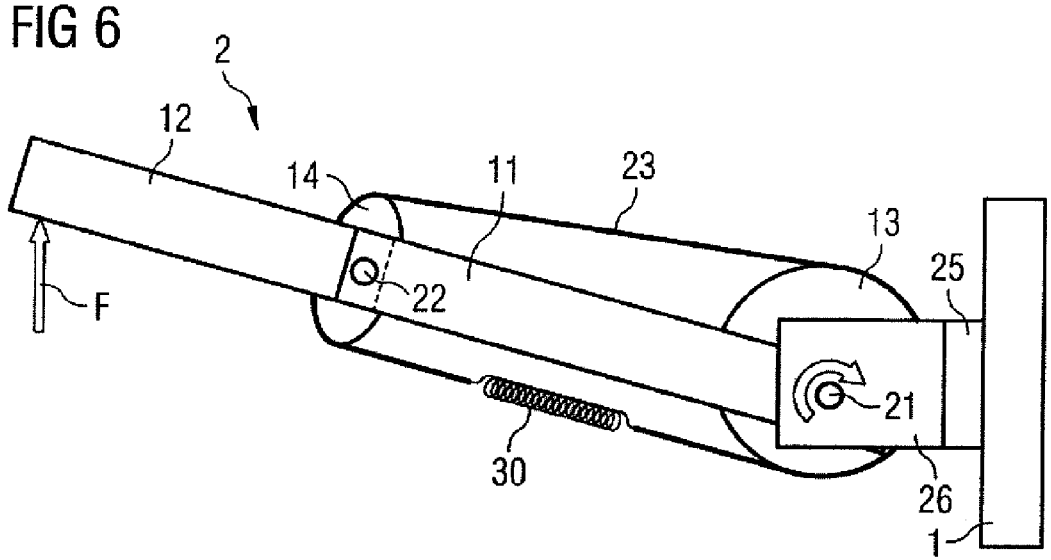

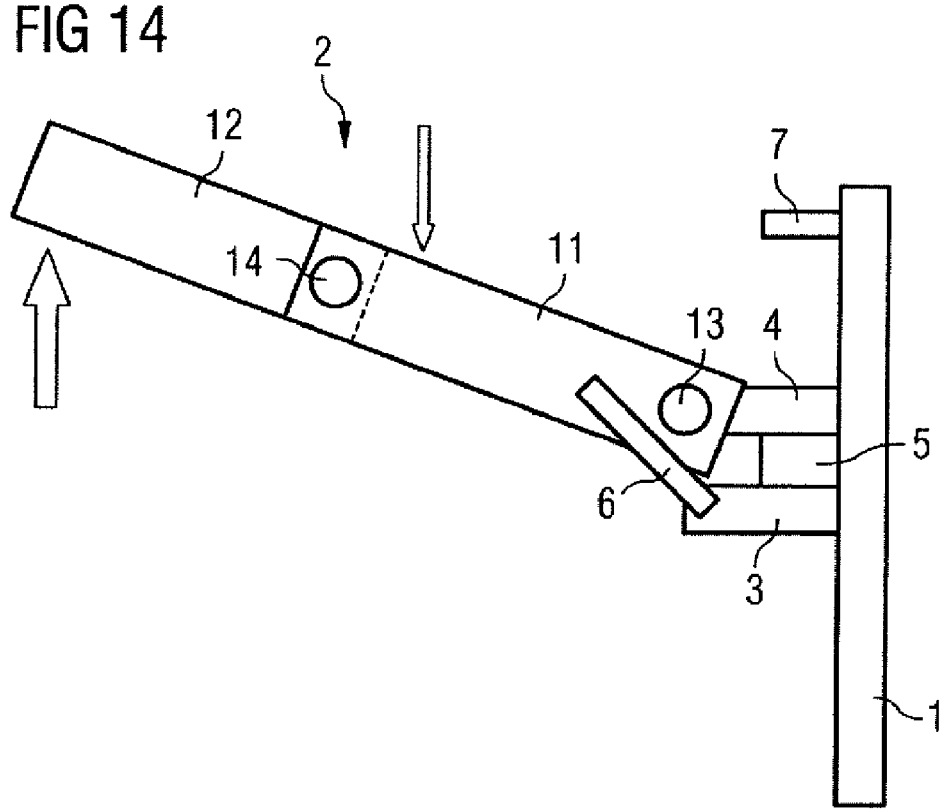
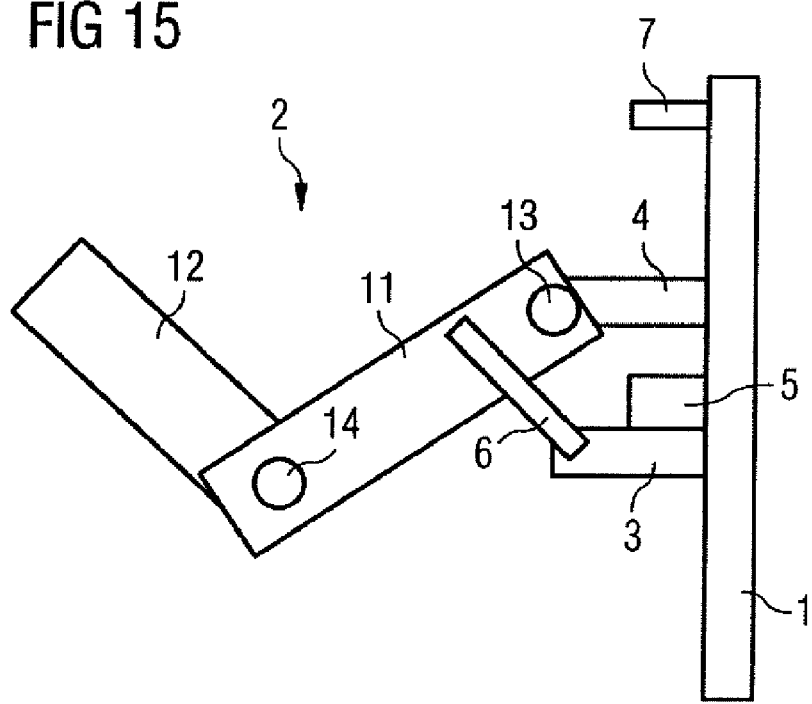

SHOULDER JOINT

The present patent document claims the benefit of the filing date of DE 10 2007 023 847.0, filed May 23, 2007, which is hereby incorporated by reference.

BACKGROUND

The present embodiments relate to a shoulder joint.

Medical equipment is used for patients, irrespective of their particular physical characteristics. The medical equipment carries out different examinations using one piece of equipment. The medical equipment is multipurpose. The equipment is designed to meet these requirements. An X-ray machine or a fluoroscopy machine, which obtain photographs, are examples of medical equipment. The medical equipment includes a device that is used for pushing away or compressing the fatty tissue of the patient under examination according to the examination or physical characteristics of the patient. An extension or arm is used, which is adapted to suit the equipment as required. The extension can move perpendicular to the surface on which the patient lies, so that vertical adjustment to suit the individual physical characteristics of the patient (e.g. obesity) is possible. The extension is moved in the vertical direction by mounting the extension on a movable carriage.

SUMMARY AND DESCRIPTION

The present embodiments obviate one or more of the limitations or drawbacks inherent in the related art. For example, in one embodiment, a shoulder joint provides versatile use of an equipment arm.

In one embodiment, a shoulder joint includes a main support and a fold-out arm. The fold-out arm includes an upper arm and a lower arm. The upper arm is hinged or pivoted about a pin, and the lower arm is attached/mounted so that it can pivot on a spindle on a first end of the upper arm. The pin may be arranged on a second end of the upper arm, which differs from the first end, so that, for example, for an upper arm having two ends, the one end is pivoted on the pin and the second end carries the spindle holding the lower arm. Folding out the arm relates to a relative movement of upper arm and lower arm (called bending and straightening in the human arm). The relative movement of the upper arm and lower arm is implemented by a first wheel being arranged on the pin, and a second wheel being arranged on the spindle, with the two wheels being mechanically linked in such a way that rotation of the upper arm about the pin (i.e. relative to the first wheel, which is fixed to the pin) causes rotation of the second wheel and of the lower arm relative to the upper arm. The wheels may be belt-driven wheels or sprockets, with the mechanical link being a belt or a chain tensioned around the wheels.

The arm, including the upper and lower arms, allows a space-saving arrangement of the arm when it is in the folded-in state. The arm may be folded out by rotating the upper arm about the pin. Rotating the upper arm about the pin automatically causes, (e.g., the mechanical link causes), a relative movement of upper and lower arm (bending/straightening). Accordingly, a single drive may cause two different types of movement (e.g., rotation of the upper arm and bending/straightening of the arm). The shoulder joint saves space by dividing the arm into an upper and lower arm, and having a single drive for two movements.

In one embodiment, the wheels may lock the relative position of upper and lower arm when the arm has been folded out. For example, by designing the wheels and the mechanical link such that in defined applications, where pressure is exerted on the arm (usually the lower arm), the magnitude of the resulting torque about the spindle is minimized. In order to achieve this self-locking, a different shape than a circle can be provided for the wheels, for example, the second wheel may be shaped as an ellipse. The wheel shape allows the arm to fold in and out as fully as possible, and the ratio of the wheel diameters required for the self-locking mechanism.

In one embodiment, a force exerted on the arm (usually the lower arm) is measured using a measurement device. For example, a spring may be inserted in the belt or chain. The spring may be used to measure the force exerted on the arm. Alternatively the force may be measured using the change in length of a strut used to fold out the arm, or from the change in angle of the upper arm about its pin.

In one embodiment the shoulder joint includes the main support, the fold-out arm, to carriages arranged on the main support (referred to below as the first and second carriage), and a first coupling for coupling the two carriages. The arm is fastened to the second carriage by a pin. The arm may be pivoted about the pin. The first carriage may be connected to the arm, such that the arm is folded out by pivoting about the pin when the two carriages move towards each other, for example, the distance between the two carriages is reduced. The first coupling is designed to couple the two carriages when the arm has been folded out (e.g. the first coupling is designed such that coupling occurs or can be effected at a minimum distance between the two carriages, at which the fold-out process is complete). The coupled-together carriages are designed to move in common (move jointly) in at least one direction.

A piece of equipment (e.g. x-ray machine) may include an arm or extension that can move for adjustments, and which can be folded out and in as required. The folding out and in of the arm by relative movement of the two carriages is achieved, for example, by a strut connecting the first carriage to the arm. The relative movement of the two carriages causes the desired movement of the arm (folding out or folding in). The relative movement of the two carriages required for the hinging out of the arm is implemented, for example, by the second carriage being fixed in a position until the arm has folded out, and the first carriage being moved towards the second carriage in order to fold out the arm. A second coupling fixes the position of the second carriage on the main support, with the second coupling being designed to release the second carriage from the fixed position when the arm has been folded out, so that when the arm has been folded out, the carriages, which are now linked together, can be moved, for example, the position of the arm may be adjusted.

In one embodiment, the first coupling includes at least one electromagnet, such that the coupling between the two carriages after folding out the arm can be effected by applying a voltage. The second coupling may be implemented by a permanent magnet. The permanent magnet may release the second carriage from the fixed position with the arm folded out by applying a voltage to the permanent magnet.

BRIEF DESCRIPTION OF THE DRAWINGS

The subject matter of the invention is explained in greater detail below using an exemplary embodiment, in which:

FIG. 1 illustrates one embodiment of a folded-in shoulder joint,

FIG. 2 illustrates one embodiment of a folded-out shoulder joint,

FIG. 5 illustrates one embodiment of a shoulder joint with a spring built into a toothed-wheel chain, FIG. 6 illustrates the yielding of the arm with a built-in spring to an upward force, FIG. 14 illustrates the arm in the de-energized state before force is applied (patient recovery), FIG. 15 illustrates the arm in the de-energized state after force is applied (patient recovery)

DETAILED DESCRIPTION

Figure 3:
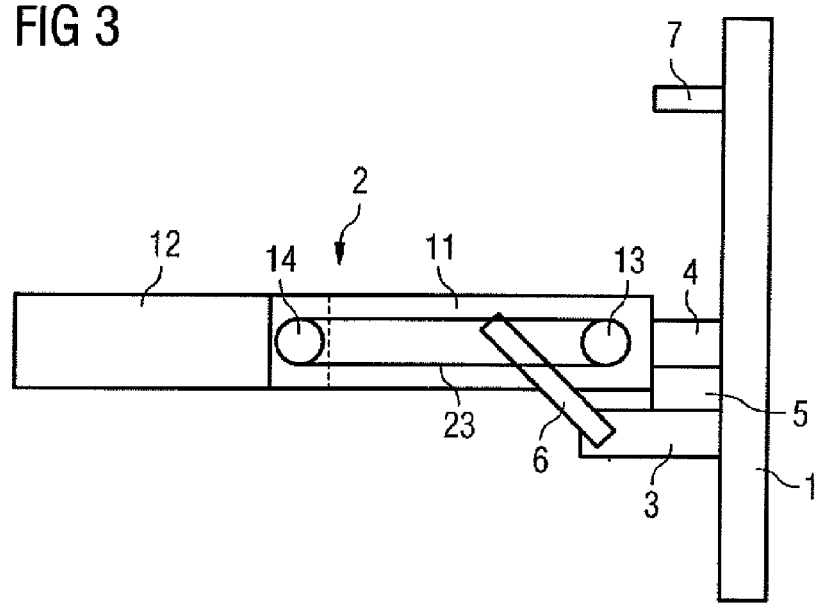
FIG. 3 illustrates the vertical mobility of a folded-out shoulder joint.

FIG. 1 shows a shoulder joint. The shoulder joint may be used with an x-ray machine or a combined x-ray/fluoroscopy machine, for example. A first or lower carriage 3 and a second or upper carriage 4 are arranged on a main support or frame 1 of the shoulder joint. FIG. 1 shows an arm 2 folded in. The arm 2 includes an upper arm 11 and a lower arm 12. A first coupling 5 and a second coupling 7, which may be magnets, for example, are also provided in the shoulder joint. In the folded-in state, the second coupling 7 holds the upper or second carriage 4 in position. A strut 6 connecting the first or lower carriage 3 to the upper arm 11 is used to fold out the arm. A first wheel 13 is shown, whose center is coincident with the pin 21 (shown in FIG. 4) about which the arm 2 pivots. A second wheel 14 and the lower arm 12 are attached to a spindle 22 (shown in FIG. 4). Both wheels 13, 14 are linked by a chain or a belt 23. For folding out, a drive is used to convey the lower carriage 3 upwards in a guide rail towards the second carriage 4. The strut 6 exerts a force on the upper arm 11, so that it is folded out into the horizontal. The upper arm 11 rotates about the first wheel 13, and the chain 23 linking the two wheels drives the second wheel, and the lower arm 12 folds out relative to the upper arm 11. The upward movement of the lower carriage 3 results in the folding out of the upper arm 11 into the horizontal and the simultaneous straightening of the lower arm 12.

FIG. 2 shows the shoulder joint in the folded-out state. The upper carriage 4 is decoupled from its position, for example, by a voltage being applied to the second coupling 7, which may be a permanent magnet, and cause a de-coupling. Both carriages 3, 4 are coupled together by the first coupling 5 (e.g. an electromagnet), so that the coupled carriages 3, 4 are then able to move together along the guide rail, and the height of the arm 2 may be adjusted. FIG. 3 illustrates the vertical movement, where the arm 2 has been moved downwards by the two carriages 3, 4, for example, onto a patient.

As shown in FIGS. 1-3, the operation of the shoulder joint does not depend on a specific spatial orientation of the main support 1. In medical applications, the shoulder joint may be used for compressing fatty tissue irrespective of the patient position, which may be at any angle between 0 and 90 degrees to the horizontal. The patient may be placed in a horizontal position.

Figure 4:
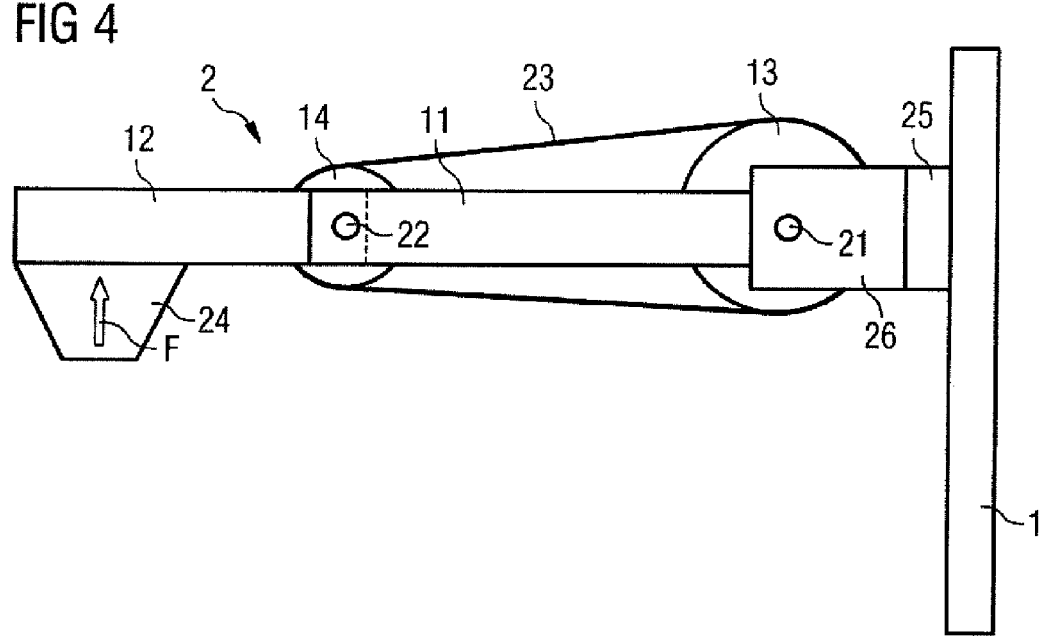
FIG. 4 illustrates one embodiment of a shoulder joint with an arm including an upper and lower arm and both arm sections linked by sprockets.

FIG. 4 shows the shoulder joint of FIG. 1 to 3. FIG. 4 illustrates the pin 21, the spindle 22, and the two wheels 13, 14. A cone 24 used for medical applications is also shown in FIG. 4. The carriage element is formed by a linear-guide carriage 25 and a carriage mount 26 including the pin 21. The wheels 13, 14 are sprockets or belt-driven wheels, which may be connected by a chain or belt 23. The first sprocket 13 is fixed to the pin 24 of the carriage mount 26, so that the arm 2 may rotate about the sprocket 13 and simultaneously about the pin 21. The upper arm 11 may pivot on the pin 21. The second sprocket 14, like the lower arm 12, is fixed to the spindle 22, so that lower arm 12 and sprocket 14 rotate together. A cone 24, for example, for medical applications is arranged at the end of the arm. This cone is a compression cone, for example, on which a force acts.

Figure 7:
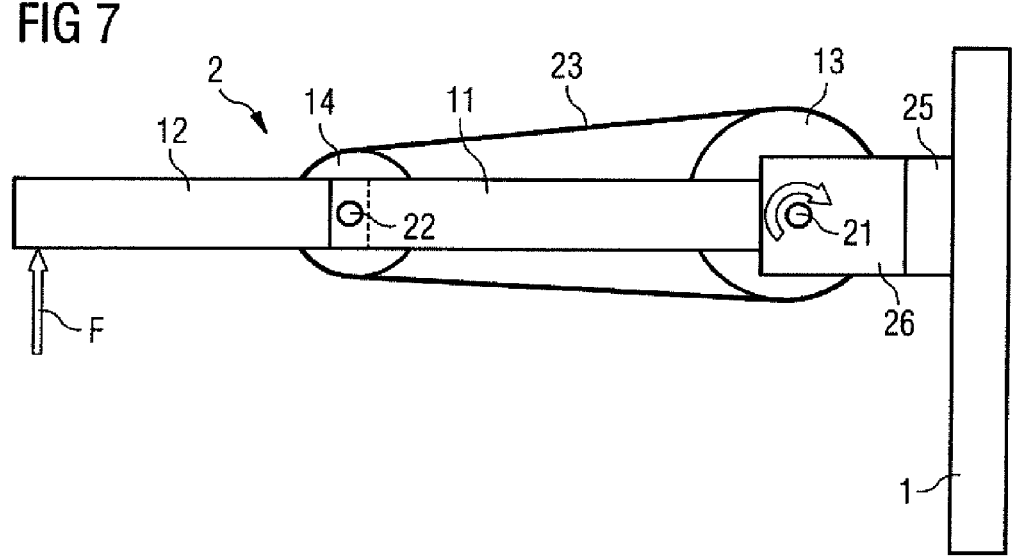
FIG. 7 illustrates one embodiment of a shoulder joint having a rigid arm.

Under the action of a force F, the straightened arm (e.g., upper arm 11 and lower arm 12) may move (rotate) about the pivot point of the pin 21 of the upper carriage. Moving about the pivot point of the pin 21 may, for example, be useful on an arm 2 that is compressing the tissue of the patient, because unlike a yielding arm, the patient normally finds a rigidly applied arm more pleasant and less confining. A yielding arm can be used, for example, to compensate for respiratory movements. A yielding arm is achieved, for instance, by attaching a spring 30, whose extensibility produces the yielding behavior or cushioning of the arm under the action of force. This is shown in FIGS. 5 and 6. If this spring 30 is dispensed with, the arm design remains rigid as shown in FIG. 7.

FIG. 5 shows the straightened arm (upper and lower arm). The straightened arm may move about the pivot point of the pin by introducing a spring element 30 in the lower stretch of the chain. Under the action of a force F, the straightened arm (upper and lower arm) may move about the pivot point of the pin of the upper carriage through an angle that depends on the size of the exerted force F (FIG. 6). If, for example, during compression, the force F is exerted on the lower arm 12, the lower length of the chain drive is placed under tension. The arm 2 is pushed upwards until the tension is large enough to cancel out the torque about the pin 21 caused by the force F. Respiratory movement may be compensated by incorporating a spring.

In one embodiment the spring unit is not included in the lower length. The folded-out arm design remains rigid (FIG. 7). The arm 2 does not cushion upwards.

Figure 8:
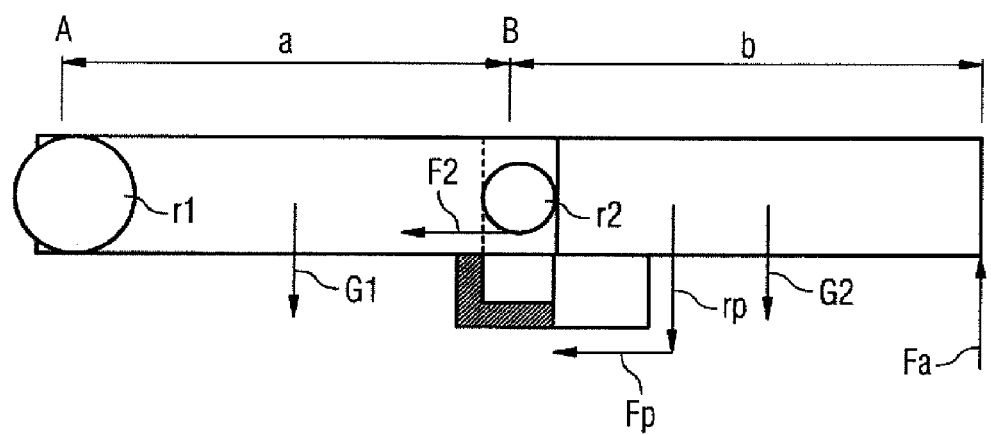
FIG. 8 illustrates a schematic diagram of an arm used for a model calculation.

For the case where the arm 2 is intended to yield (FIG. 6), the arm 2 may remain rigid, for example, the lower arm 12 does not buckle with respect to the upper arm 11. The arm 2 does not bend, but rather the arm 2 just hinges back about the fixed pin 21. This is achieved by locking the upper 11 and lower 12 arm together. For example, an additional locking device that is deployed when the arm 2 is fully straightened may be used to lock the upper 11 and lower 12 arm together. Another way is explained in conjunction with FIG. 8. Under the action of a force F and yielding of the arm 2, as shown by the example in FIG. 6, at one end of the arm 2, a torque acts about the point given by the spindle 22 that attempts to fold the lower arm 12 upwards. At the other end of the arm 2, a force is exerted by the extended spring 30, causing a torque to act about the spindle 22 in the other direction. By selecting the relative dimensions of the components used, the two torques may be set to be substantially equal in magnitude so that there is no resulting bending of the arm 2. The equalizing of torques may be a self-locking mechanism. FIG. 8 shows the arm with respect to the calculations below. FIG. 8 shows the arm 2 with acting forces. According to the example calculation below, the torques about the pin 21 and the spindle 22 vanish simultaneously, so that there is no resulting bending of the arm 2. In order to achieve a certain safety margin against bending, the equation includes a 10 N contact force for the lower arm pressing against the upper arm.

Given a certain transmission ratio (see the example calculation below) between the two sprockets and a certain torque arm from application of force (point of the patient compression) to the spindle at the front end of the upper arm, then the two arms do not perform any movement relative to each other. The lower arm does not buckle. Therefore, an additional locking element is not required.

The example calculation for FIG. 8 for the transmission ratio of the sprockets at which the arms do not buckle is based on the following configuration:
r1: radius of sprocket 1
r2: radius of sprocket 2
G1: own weight of upper arm=20 N
G2: own weight of lower arm=10 N
Fa: compression force=150 N
rp: distance between center of sprocket 2 and the point at which the contact force is applied=30 mm
Fp: contact force of lower arm pressing on upper arm=10
a: length of upper arm=430 m
b: length of lower arm=430 mm The ratio of the sprockets is calculated using the requirement that the resultant torques about pin 21 and spindle 22 vanish.

$$\Sigma M_A = 0 = a/2 * G1 + r1 * F2 + G2 * (a+b/2) - Fa(a+b) + rp*Fp = 215 \text{ mm} * 20 \text{ N} + r1 * F2 + 10 \text{ N} * 645 \text{ mm} - 150 \text{ N} * 860 \text{ mm} + 10 \text{ N} * 30 \text{ mm}; \text{ and therefore, } F2 = 117950 \text{ Nmm}/r1$$

$$\Sigma M_B = 0 = b/2 * G2 + r2 * F2 - b * Fa - rp*Fp = 215 \text{ mm} * 10 \text{ N} + r2 * F2 - 430 \text{ mm} * 150 \text{ N} - 10 \text{ N} * 30 \text{ mm}; \text{ and therefore, } F2 = 62650 \text{ Nmm}/r2. \text{ Accordingly, } r1/r2 = 117950 \text{ Nmm}/62650 \text{ Nmm} = 1.88.$$

Figure 9:
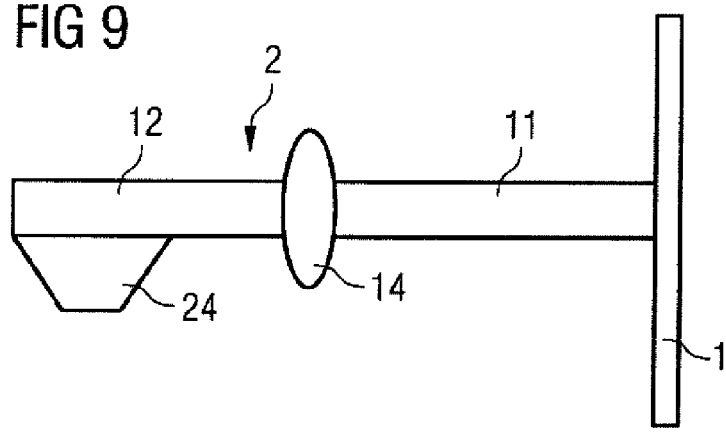
FIG. 9 illustrates one embodiment of an arm with an elliptic sprocket
Figure 10:
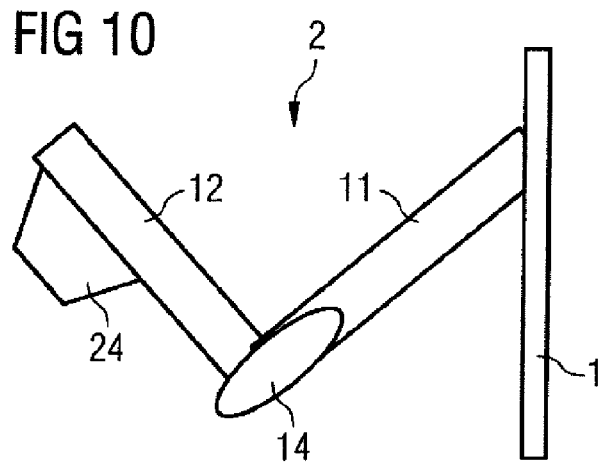
FIG. 10 illustrates another embodiment of an arm having an elliptic sprocket with an angle of 90° between an upper and lower arm.
Figure 11:
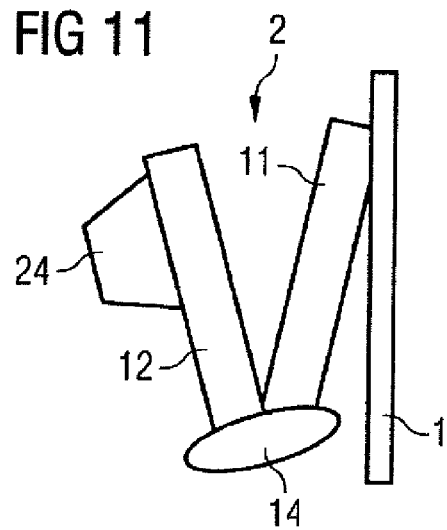
FIG. 11 illustrates one embodiment of a folded-in arm having an elliptic sprocket.

In one embodiment, the second wheel 14 may be shaped as an ellipse. This elliptic wheel is shown in FIGS. 9, 10 and 11 in the folded-out state, at an angle of 90° between upper and lower arm, and fully folded-in, respectively.

Figure 12:
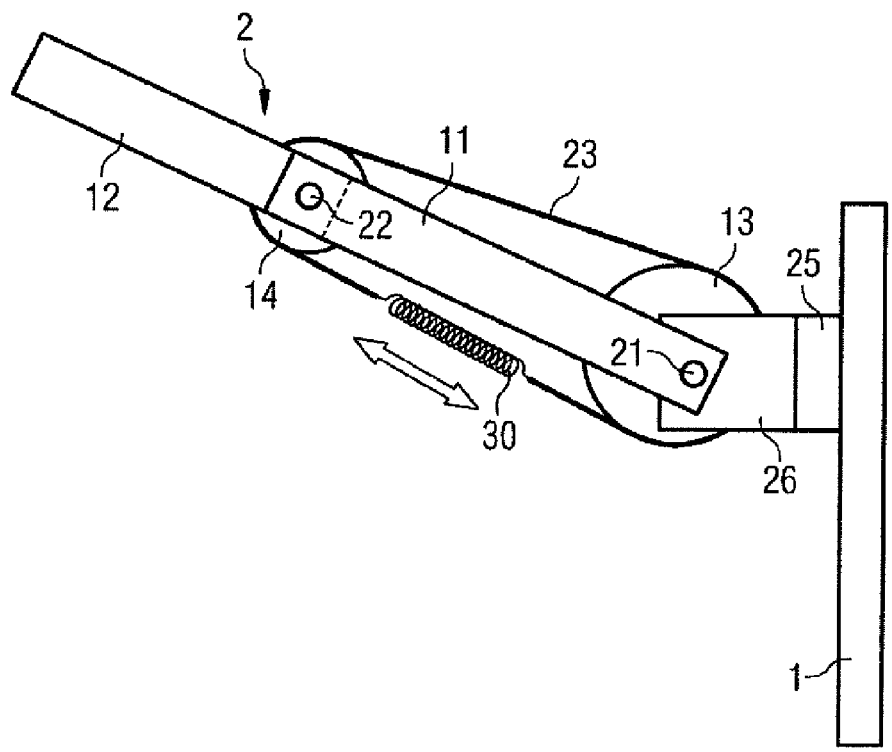
FIG. 12 illustrates measurement of force in the arm using a spring.
Figure 13:
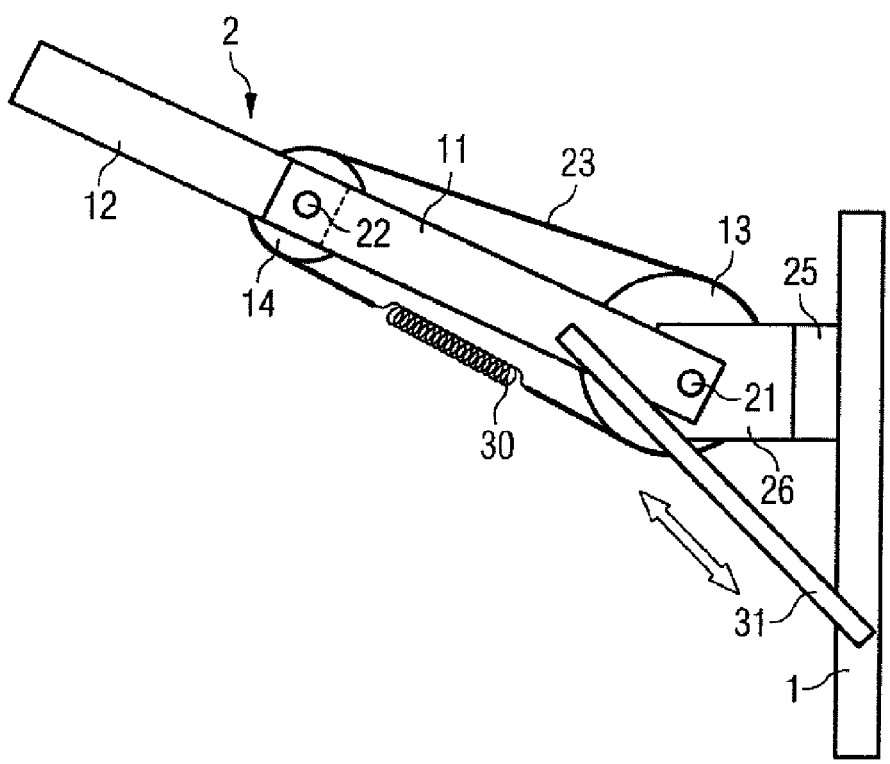
FIG. 13 illustrates measurement of force in the arm by a change in length of a strut.

The force acting on the arm may be measured. The force may be measured, for example, from the change in length of the spring (FIG. 12) or a change in length of a strut 31 (FIG. 13). As shown in FIGS. 12 and 13, the forces that occur, for example, on the compression cone in the fluoroscopy machine application, may be measured from the change in length of the spring in the lower length of the chain drive or belt drive or by a linear potentiometer mounted on the strut used for the folding-out action.

FIG. 14 and FIG. 15 illustrate embodiments of the shoulder joint that may be beneficial in medical applications.

The self-locking action of the embodiment of FIG. 5 and FIG. 6 was explained with reference to FIG. 8. The self-locking mechanism results from compensation of the force F (compression force) pressing the arm 2 upwards from below by a counterforce (or an opposing torque) that is produced by the tension of the spring. Since the spring has only limited extensibility, the compression force F can only be compensated up to a maximum force related to the spring properties. For greater forces, the belt or chain connecting the wheels remains essentially stiff (e.g., without extending). The lower arm 12 is pushed upwards by the compression force F, with the belt or chain driving the first wheel 13 from the second wheel 14. The fold-out mechanism described with reference to FIG. 1 to FIG. 3 may be used in reverse. For example, instead of force transmission from the lower carriage to the upper arm, and to the lower arm by movement of the chain/belt, force is transmitted to the upper arm, then by movement of the belt/chain to the lower arm and from the lower arm to the lower carriage).

This ability of the arm to yield under larger forces is beneficial for safety purposes in medical applications.

In the event of an emergency, it is possible to recover a patient under applied compression.

Under normal conditions with voltage connected to the equipment, applying the "counterforce" F, for example, the pressure on the elbow joint, may overcome the force conditions leading to the self-locking mechanism and the retaining force of the lower coupling magnet 5, as explained above, and the arm folds in (FIG. 15).

Patient recovery is also covered in the de-energized state. The lower coupling magnet (electromagnet), which holds the two carriages together during the compression, is not magnetic in the de-energized state. Thus the entire arm folds up on itself under low compression forces if there is a power failure (FIG. 15) ensuring straightforward patient recovery. For larger compression forces it can be useful to apply a certain counterforce on the upper arm in order to compensate the self-locking forces that oppose the arm folding in.

Figure 16:
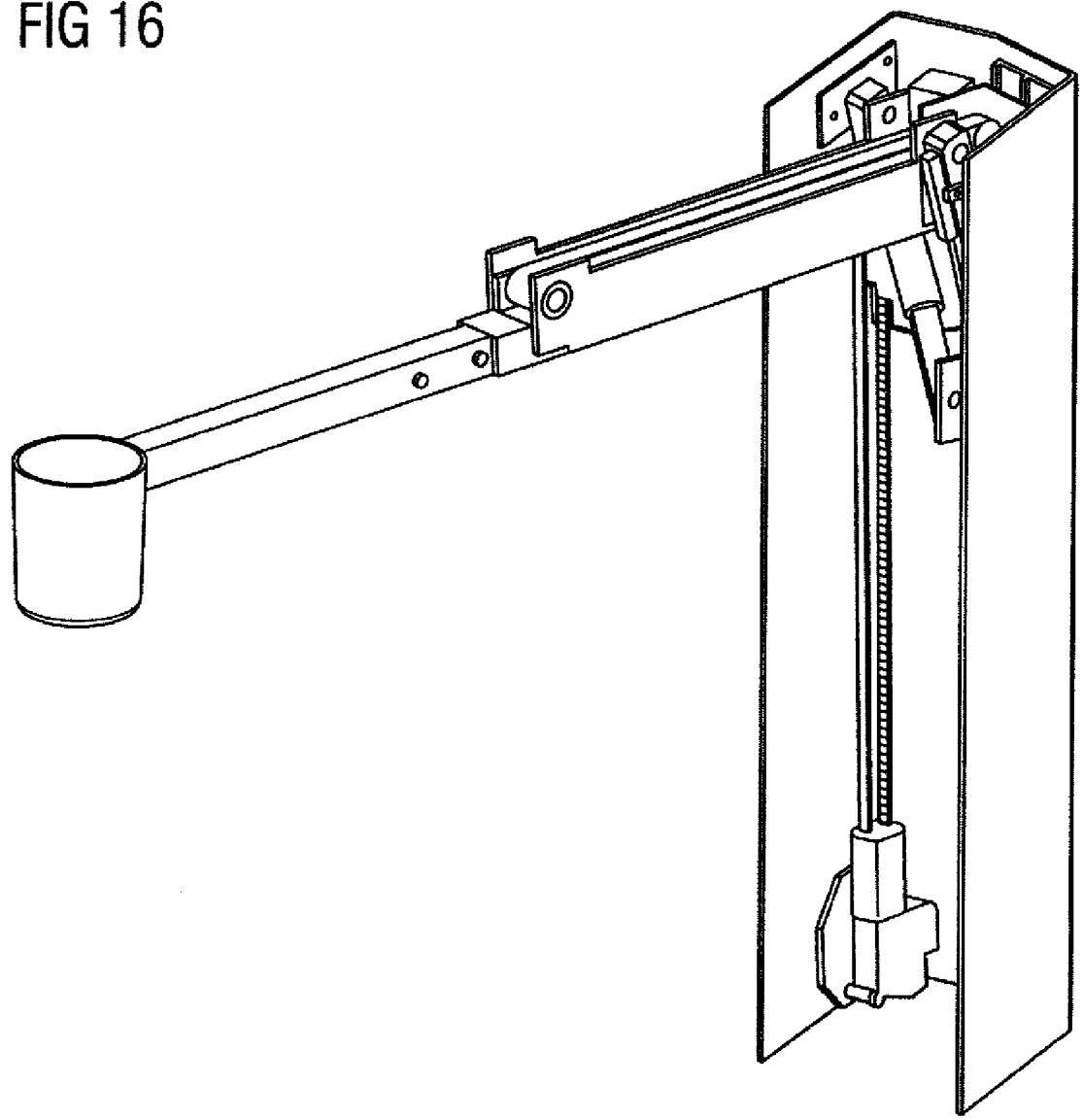
FIG. 16 illustrates the entire construction of a shoulder joint
Figure 17:
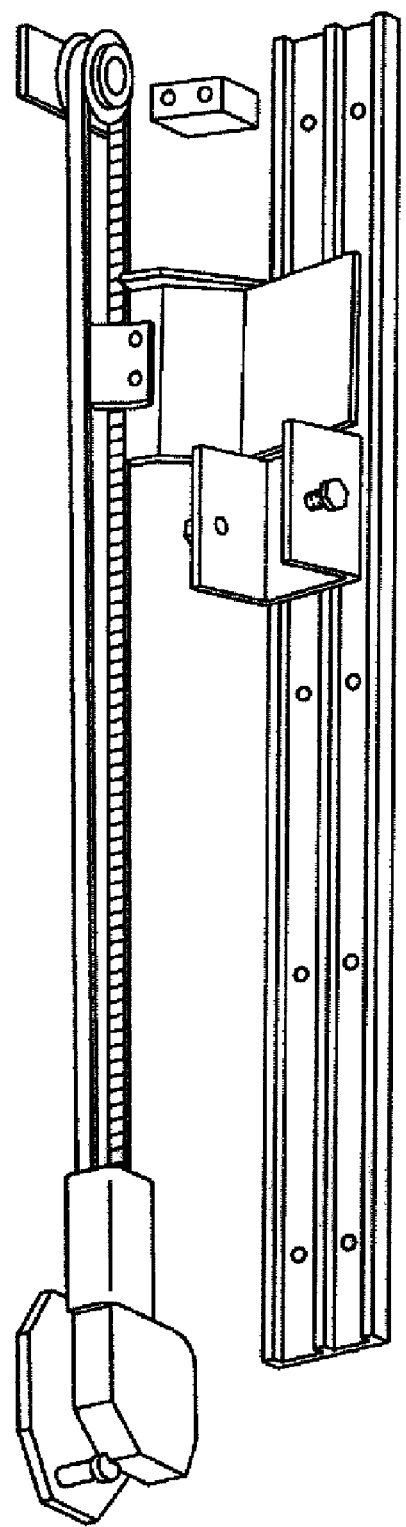
FIG. 17 illustrates a conversion of the rotational movement of the motor into a translational movement.

FIG. 16 to FIG. 21 show a specific embodiment of the shoulder joint for a medical application. The entire structure is shown in FIG. 16. The rotational movement of a motor is translated into a translational movement (FIG. 17).

The rotational movement of the motor is converted into a translational movement using a drive belt. The drive belt drives the lower carriage or, with the arm folded out, the coupled carriages. The lower carriage of the compression unit is fixed to the drive belt and runs in a guide rail.

Figure 18:
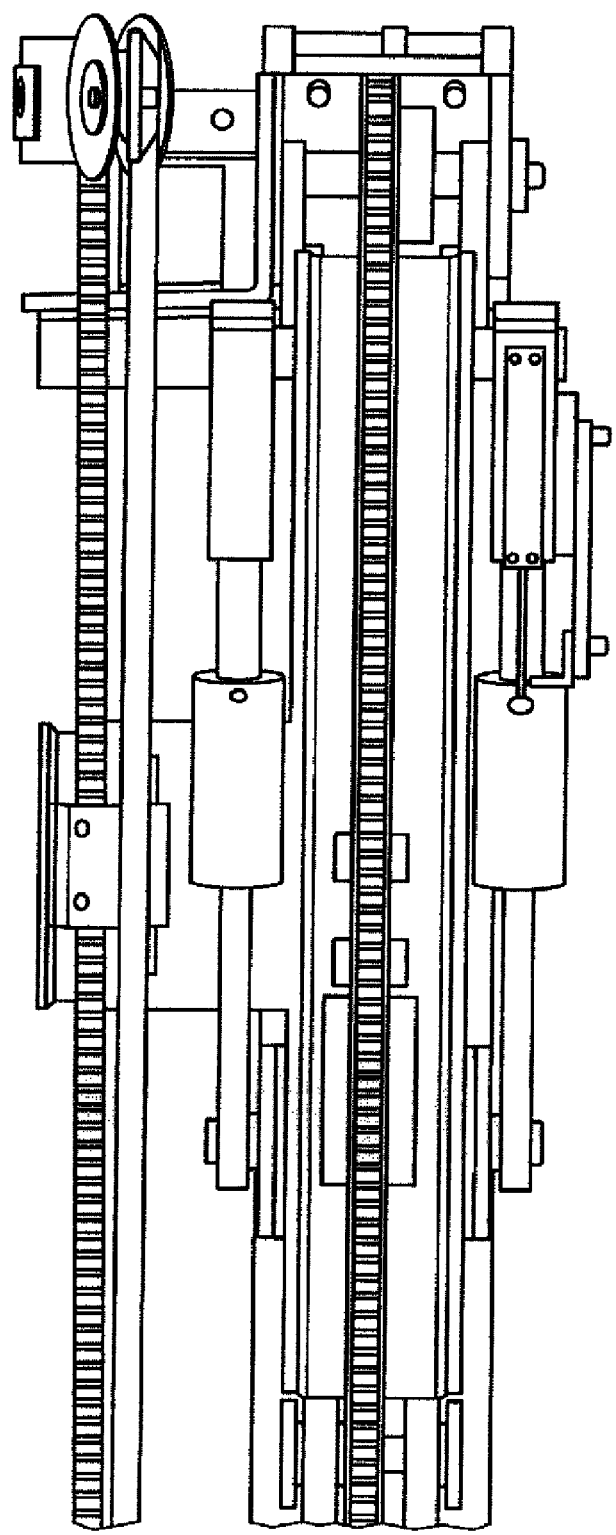
FIG. 18 illustrates the folding out and in of a compression unit.

FIG. 18 illustrates how a compression unit used for a medical application may be folded out and in.

To fold out the compression unit, the fold-out button on the console is pressed. The motor starts running and moves the lower carriage towards the upper carriage until the facing plate of the lower carriage reaches the two lower electromagnets or a limit switch. While the lower carriage moves toward the upper carriage, the two struts turn the E-arm (examination arm corresponding to the upper arm), which is lying vertically downwards, upwards through 90°.

The two struts may be connected, so that the struts can pivot on the lower carriage and on the arm.

The E-arm (upper arm) is pivoted on a pin in the upper carriage. The upper carriage may be fixed to the frame via a permanent magnet and fixed in a stationary position.

Figure 19:
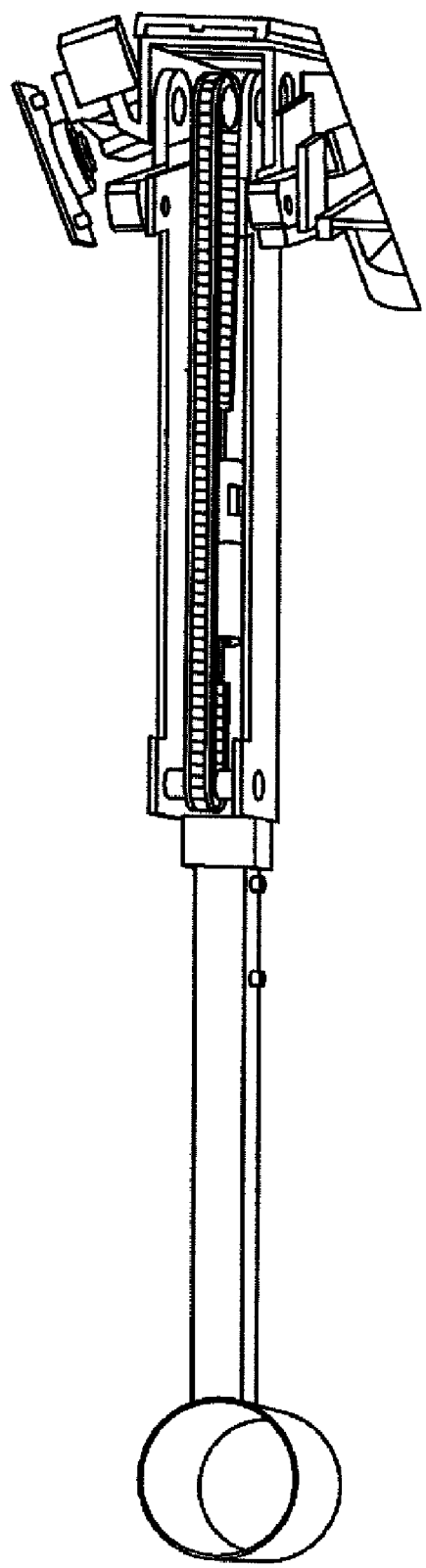
FIG. 19 illustrates one embodiment of an arm.

FIG. 19 shows the lower arm or carbon fiber reinforced plastic (CFP) arm. The CFP arm fitted with a cone may be folded out while the upper arm is pivoting. The CFP arm folding out may be achieved by a chain located in the E-arm. The lower arm may or may not be made of CFP; for example, the lower arm may be made of steel. The same is true of the cone, which may be made of CFP or polystyrene, for instance.

The chain may run over two sprockets. Sprocket 1 is fixed to the pin in the upper carriage and sprocket 2 is located in the front of the E-arm (upper arm). The sprocket 2 may be fixed to the spindle located on the upper arm.

An adapter to the CFP arm may be fixed to the spindle.

The chain runs over the fixed sprocket 1 and turns the sprocket 2 with the spindle when the E-arm (upper arm) is folding out. The upper arm rotates upwards through 90°. Accordingly, the adapter and the CFP arm are turned.

The compression arm may be folded-in in the reverse order to folding out.

Figure 20:
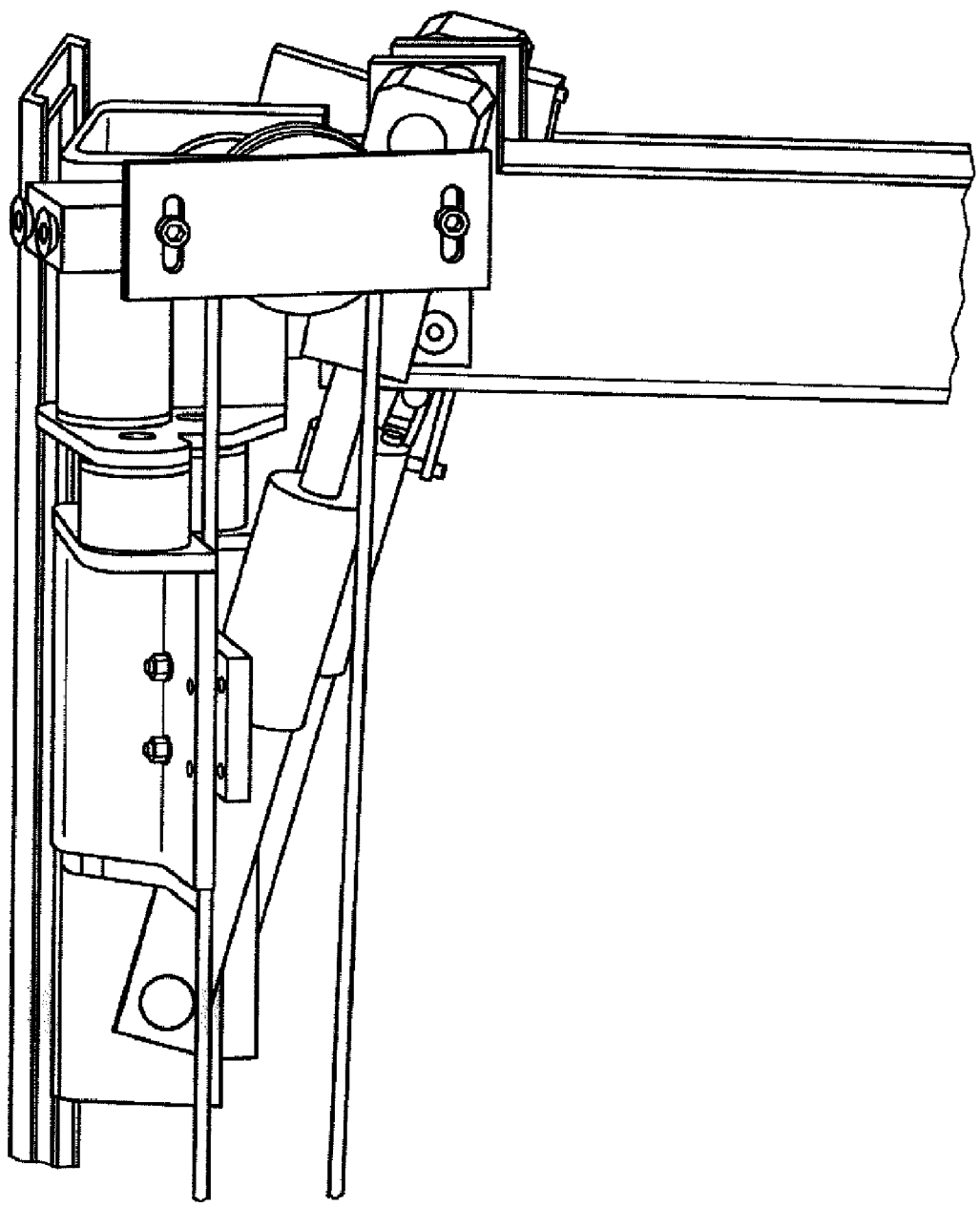
FIG. 20 illustrates the transition from the fold-out movement to the compression movement.

The transition from the folding-out movement to the compression movement is illustrated in FIG. 20. The compression unit is fully folded out when the lower carriage reaches a position against the two lower magnets. Voltage may be applied to the two lower magnets. The two electromagnets may become magnetic and hold the lower carriage. The upper and lower carriages are fixed together. Voltage is now applied to the permanent magnet. The permanent magnet loses its magnetic effect and is no longer connected to the frame.

If the motor is started, the two connected carriages move downwards and compression is possible.

Figure 21:
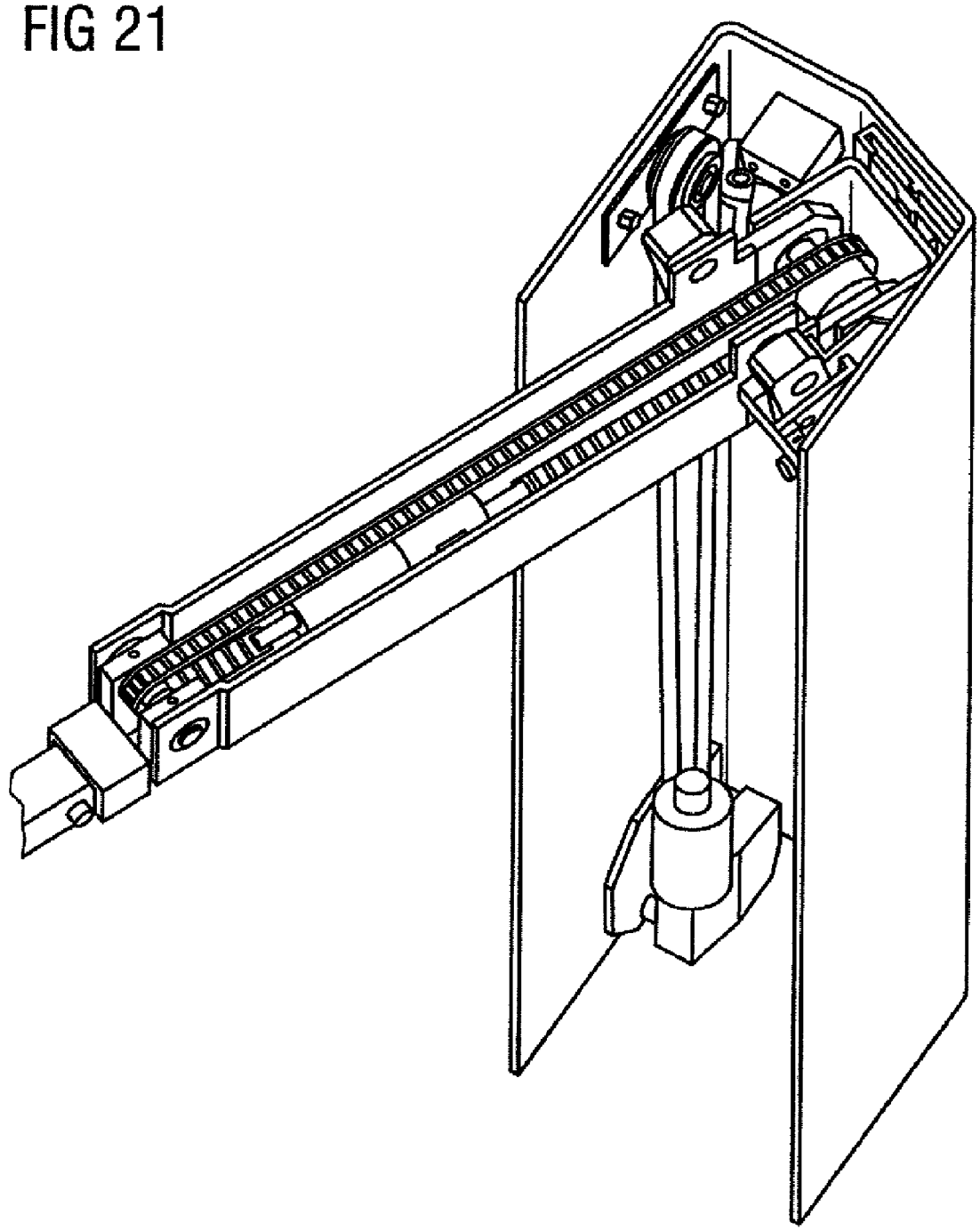
FIG. 21 illustrates a compression arm.

Cushioning of the compression arm during compression may be performed as shown in FIG. 21.

If a force acts on the cone during compression, the force is transferred to the chain. A spring assembly located in the chain allows the chain to expand or extend. The expansion of the chain allows the E-arm (upper arm) holding the CFP arm to rotate about the pin in the upper carriage and is cushioned.

Figure 22:
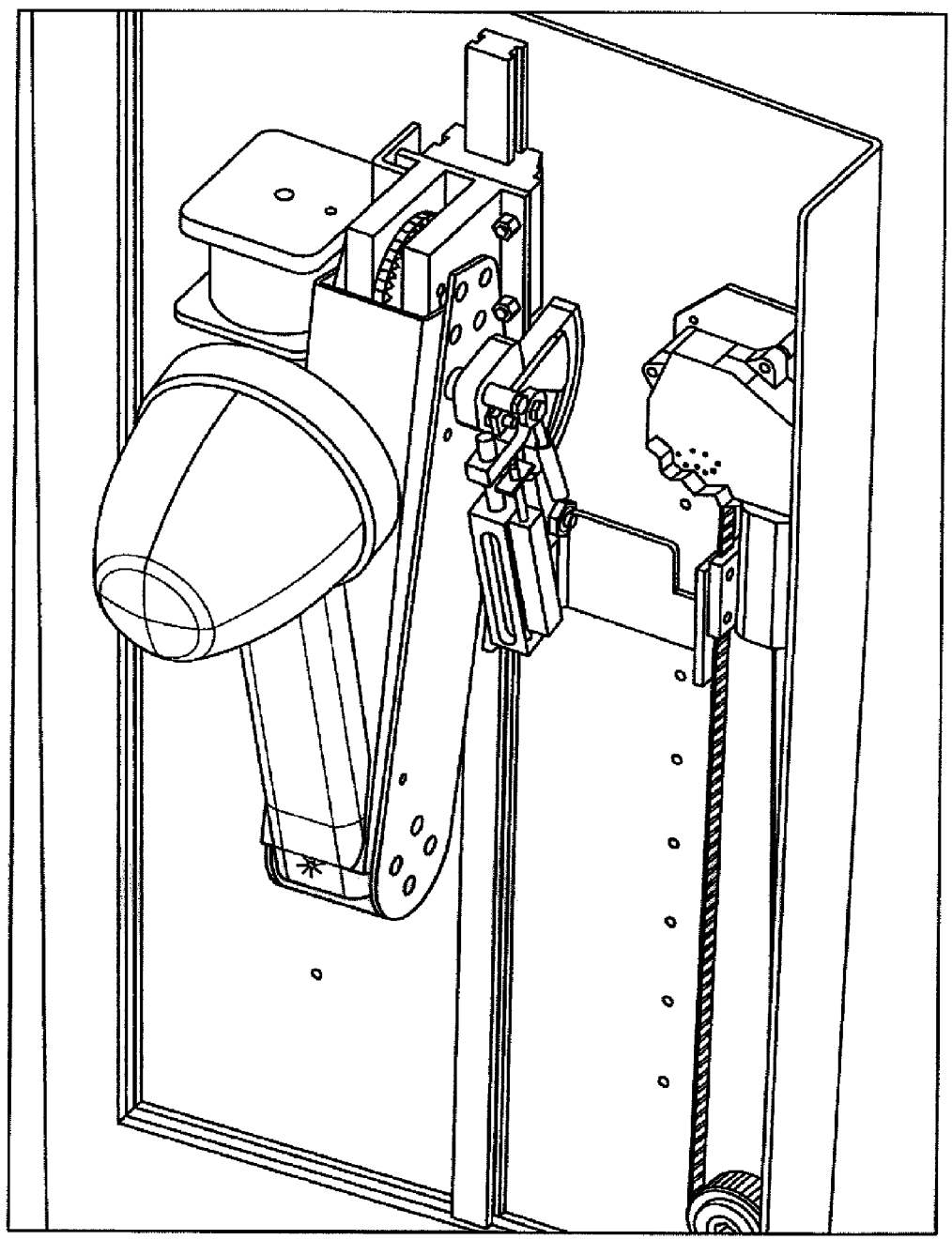
FIG. 22 illustrates a shoulder joint with an arm.
Figure 23:
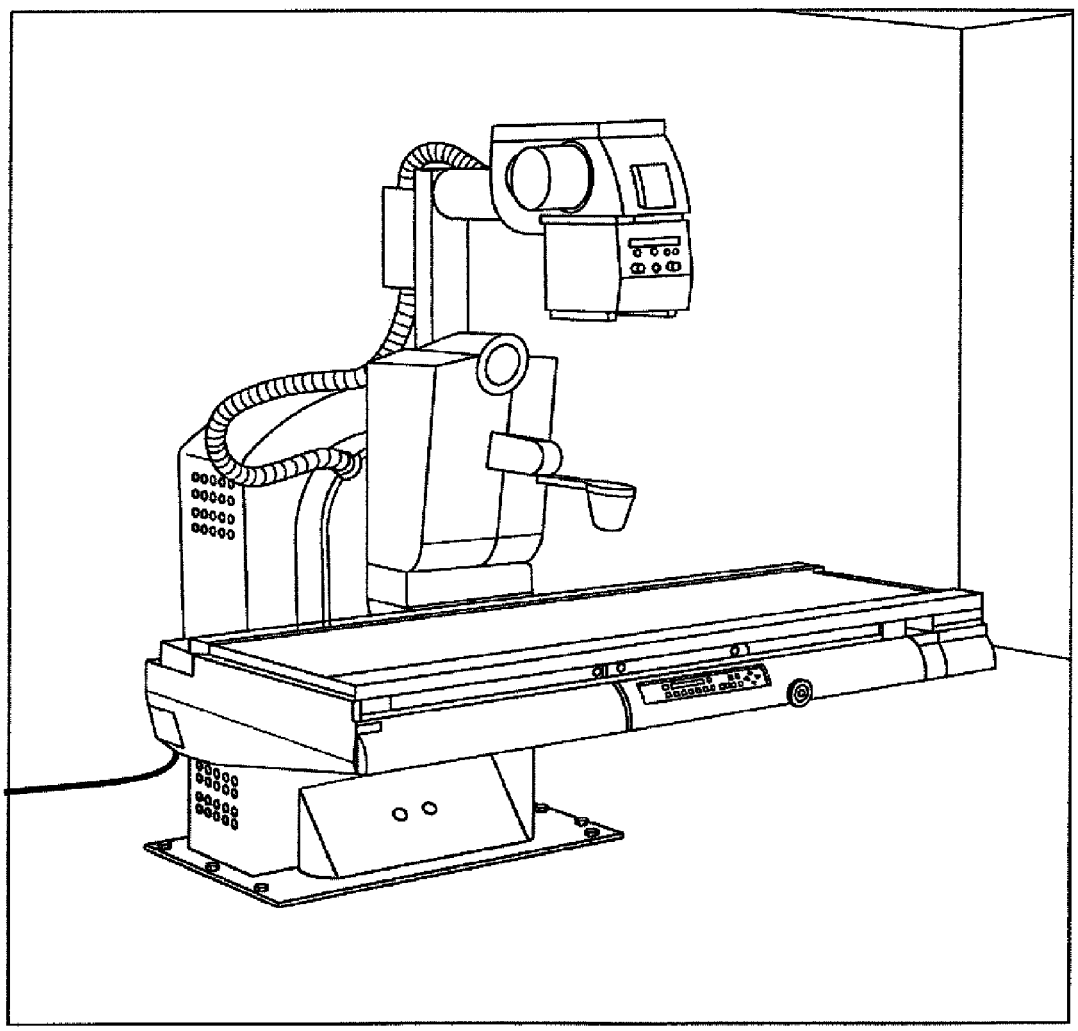
FIG. 23 illustrates one embodiment of medical equipment fitted with shoulder joint according to the invention.

The shoulder joint is shown more schematically in FIG. 22. This shoulder joint can be used in an x-ray machine, for example, as shown in FIG. 23.

The invention is not limited to medical applications. For example, the shoulder joint according to the invention can be used in the field of automation or in the robotics field. A factory robot, for instance, can be fitted with a shoulder joint according to the invention in order to ensure flexible folding out and in of an arm.

The invention claimed is:

1. A fold-out shoulder joint comprising:
   a main support;
   a fold-out arm including an upper arm and a lower arm, the upper arm operable to pivot about a pin and the lower arm operable to pivot on a spindle on one end of the upper arm;
   a first wheel attached to the pin;
   a second wheel attached to the spindle;
   a first carriage and a second carriage arranged on the main support; and
   a first coupling for coupling the first carriage and the second carriage,
   wherein the upper arm is fastened to the second carriage by the pin, and the first carriage is connected to the upper arm such that the fold-out arm is folded out by pivoting about the pin when the first carriage and the second carriage are moved towards each other,
   wherein the first coupling is operable to couple the first carriage and the second carriage when the fold-out arm has been folded out, and the first carriage and the second carriage are operable to move in common in at least one direction, and
   wherein the upper arm and the lower arm are mechanically linked via the first wheel and the second wheel in such a way that rotation of the upper arm about the pin causes rotation of the second wheel and the lower arm relative to the upper arm, resulting in a bending or straightening of the fold-out arm.

2. The shoulder joint as claimed in claim 1, wherein the first wheel and the second wheel are belt-driven wheels, and the mechanical link is a belt tensioned around the first wheel and the second wheel.

3. The shoulder joint as claimed in claim 1, wherein the first wheel and the second wheel are sprockets, and the mechanical link is a chain tensioned around the first wheel and the second wheel.

4. The shoulder joint as claimed in claim 1, wherein the first wheel, the second wheel and the mechanical link are operable to lock a relative position of the lower arm and the upper arm when the fold-out arm is folded out.

5. The shoulder joint as claimed in claim 4, wherein the first wheel, the second wheel and the mechanical link are operable to minimize a resulting torque from a pressure exerted on the fold-out arm.

6. The shoulder joint as claimed in claim 5, wherein torques about the spindle and the pin are equalized.

7. The shoulder joint as claimed in claim 1, wherein the second wheel is shaped as an ellipse.

8. The shoulder joint as claimed in claim 1, wherein the mechanical link is operable for elastic yielding.

9. The shoulder joint as claimed in claim 8, wherein the mechanical link includes a spring element.

10. The shoulder joint as claimed in claim 1, wherein a strut connects the first carriage to the fold-out arm.

11. The shoulder joint as claimed in claim 1, further comprising: a second coupling operable to fix a position of the second carriage on the main support, the second coupling being operable to release the second carriage from the fixed position when the fold-out arm is folded out.

12. The shoulder joint as claimed in claim 1, wherein the first coupling includes at least one electromagnet, and a coupling of the first carriage and the second carriage, when the fold-out arm is folded out, is actuated by applying a voltage to the at least one electromagnet.

13. The shoulder joint as claimed in claim 11, wherein the second coupling includes at least one permanent magnet, and the second carriage is operable to be released from the fixed position with the fold-out arm folded out by applying a voltage to the at least one permanent magnet.

14. The shoulder joint as claimed in claim 1, wherein the main support includes a guide rail for the common movement of the first carriage and the second carriage coupled together.

15. The shoulder joint as claimed in claim 1, further comprising: a means of assessing a force exerted on the lower arm.

16. The shoulder joint as claimed in claim 15, wherein the means is a spring inserted in the mechanical link.

17. The shoulder joint as claimed in claim 15, wherein the force is measured from the change in length of a strut used for folding out the fold-out arm.

18. The shoulder joint as claimed in claim 1, further comprising: a drive unit that is operable to move the first carriage and the second carriage and to fold out the fold-out arm.

19. An X-ray machine comprising:
   an x-ray device; and
   a shoulder joint comprising:
      a main support;
      a fold-out arm including an upper arm and a lower arm, the upper arm operable to pivot about a pin and the lower arm operable to pivot on a spindle on one end of the upper arm;
      a first wheel attached to the pin, and a second wheel attached to the spindle;

a first carriage and a second carriage arranged on the main support; and a first coupling for coupling the first carriage and the second carriage, wherein the upper arm is fastened to the second carriage by the pin, and the first carriage is connected to the upper arm such that the fold-out arm is folded out about the pin when the first carriage and the second carriage are moved towards each other, wherein the first coupling is operable to couple the first carriage and the second carriage when the fold-out arm has been folded out, and the first carriage and the second carriage are operable to move in common in at least one direction, and wherein the upper arm and the lower arm are mechanically linked via the wheel and the second wheel in such a way that rotation of the upper arm about the pin causes rotation of the second wheel and the lower arm relative to the upper arm, resulting in a bending or straightening of the fold-out arm.

20. The x-ray machine as claimed in claim 19, wherein the x-ray device is a fluoroscopy device.

21. A robot comprising:

a shoulder joint including:

a main support;

a fold-out arm including an upper arm and a lower arm, the upper arm operable to pivot about a pin and the lower arm operable to pivot on a spindle on one end of the upper arm;

a first wheel attached to the pin, and a second wheel attached to the spindle;

a first carriage and a second carriage arranged on the main support; and a first coupling for coupling the first carriage and the second carriage, wherein the upper arm is fastened to the second carriage by the pin, and the first carriage is connected to the upper arm such that the fold-out arm is folded out by pivoting about the pin when the first carriage and the second carriage are moved towards each other, wherein the first coupling is operable to couple the first carriage and the second carriage when the fold-out arm has been folded out, and the first carriage and the second carriage are operable to move in common in at least one direction, and wherein the upper arm and the lower arm are mechanically linked via the first wheel and the second wheel in such a way that rotation of the upper arm about the pin causes rotation of the second wheel and the lower arm relative to the upper arm, resulting in a bending or straightening of the fold-out arm.

\* \* \* \* \*

UNITED STATES PATENT AND TRADEMARK OFFICE
CERTIFICATE OF CORRECTION

PATENT NO. : 8,011,828 B2  
APPLICATION NO. : 12/122082  
DATED : September 6, 2011  
INVENTOR(S) : Franz Beimler et al.

Page 1 of 1

It is certified that error appears in the above-identified patent and that said Letters Patent is hereby corrected as shown below:

Column 9, claim 19, line 7, please insert --by pivoting-- before "about the pin."

Signed and Sealed this  
Twenty-eighth Day of February, 2012

David J. Kappos  
*Director of the United States Patent and Trademark Office*